United States Patent [19]

Urry

[11] 4,333,994
[45] Jun. 8, 1982

[54] CELL EMPLOYING A COILED ELECTRODE ASSEMBLY

[75] Inventor: Lewis F. Urry, Columbia Station, Ohio

[73] Assignee: Union Carbide Corporation, Danbury, Conn.

[21] Appl. No.: 248,216

[22] Filed: Mar. 27, 1981

[51] Int. Cl.³ .............................................. H01M 6/10
[52] U.S. Cl. ........................................ 429/94; 429/194
[58] Field of Search ................. 429/94, 194, 101, 197

[56] References Cited

U.S. PATENT DOCUMENTS

| | | | |
|---|---|---|---|
| 2,928,888 | 3/1960 | Vogt | 429/94 X |
| 3,298,871 | 1/1967 | Binder et al. | 429/94 |
| 3,530,001 | 9/1970 | Harivel | 429/94 |
| 3,565,690 | 2/1971 | DuPlessix et al. | 429/94 |
| 3,829,330 | 8/1974 | Dey | 429/194 |
| 4,091,181 | 5/1978 | Merritt, Jr. | 429/94 |

*Primary Examiner*—Anthony Skapars
*Attorney, Agent, or Firm*—Cornelius F. O'Brien

[57] ABSTRACT

An electrochemical cell employing a coiled electrode assembly in which the segment of one wound electrode strip that is not sandwiched between layers of the other wound electrode strip has an average thickness less than the average thickness of the remaining segment of the electrode that is sandwiched between layers of the other wound electrode thereby providing for increased capacity input for a given cell volume and/or provide for a high output rate capability for a given cell volume.

13 Claims, 4 Drawing Figures

CELL EMPLOYING A COILED ELECTRODE ASSEMBLY

FIELD OF THE INVENTION

The invention relates to cells employing a coiled electrode assembly in which the segment of one wound electrode strip that is not sandwiched between layers of the other wound electrode strip has a reduced average thickness compared to the average thickness of the segment of the electrode that is sandwiched between layers of the other electrode. This type of construction will provide for increased volumetric efficiency for the active components of the cell while also reducing the internal resistance of the cell.

BACKGROUND OF THE INVENTION

Organic electrolyte cells utilizing solid depolarizers have gained considerable interest for applications usually filled by aqueous alkaline cell systems. However, one drawback in the use of organic electrolyte cell systems is that they have relatively low conductivities compared to conventional aqueous cell systems of equivalent size and construction.

To increase the interfacial area contact between active cell components and thereby decrease the resistance of the cell, coiled electrode assemblies have been employed. This type of cell construction employs rolled or coiled electrode assemblies (jelly roll construction) which are widely known in the battery art and are usually placed in a composite housing which serves as the current conductive terminals for the cells. In such structures, the electrode of one polarity is generally electrically connected to a conductive housing portion, and the electrode of the opposite polarity is generally electrically connected to another conductive housing portion which is insulated relative to the electrically conductive first-mentioned housing portion. The electrical contact between each electrode and its respective housing portion is generally formed by an elongated flexible electrically conductive connecting tab or element which is secured at one end to the electrode and at the other end is secured to the respective housing portion.

Although the coiled electrode assembly has found acceptance in such cell systems as nickel/cadmium and systems employing liquid active cathode depolarizers, the advantage of increased interfacial area of the positive and negative electrode which provides for increased conductivity is offset by the disadvantage of the physical imbalance in the electrochemically utilizable active materials due to the coil construction. Specifically, the coiled electrode assembly uses electrode strips or sheets of uniform thickness throughout its entire length which results in sections of the outermost and/or innermost wound electrodes having an opposing electrode only on one side. Thus this results in a physical imbalance in the electrochemically utilizable active materials thereby wasting space that could be occupied by additional utilizable active material that could contribute to the output capacity of the cell.

It is an object of the present invention to provide a coiled electrode assembly for various cell systems that will allow for a substantial physical balance of the electrochemically utilizable active materials thereby resulting in increased output capacity for a given cell size.

Another object of the present invention is to provide a coiled electrode assembly in which the segment of the electrode strip that is not sandwiched between layers of the other electrode strip will have an average thickness less than the average thickness of the remaining portion of the electrode strip that is sandwiched between layers of the other electrode strip.

Another object of the present invention is to provide an organic electrolyte cell employing a solid cathodic electrode strip and an anodic electrode strip that are longitudinally offset and then helically wound into a coiled electrode assembly that will provide excellent output capacity for a given cell size.

Another object of the present invention is to provide a cylindrical $MnO_2$ or $CF_x$/organic electrolyte/lithium cell having a relatively good conductivity and output capacity for a given cell size.

The foregoing and additional objects will become more fully apparent from the description hereinafter and the accompanying drawings.

SUMMARY OF THE INVENTION

The invention relates to an electrochemical cell comprising a coiled electrode assembly disposed within a container closed by a cover, said coiled electrode assembly comprising an elongated first electrode strip, an elongated second electrode strip and a separator, all of which are helically wound about each other so that the separator is interposed between said first electrode strip and said second electrode strip, the improvement wherein the portion of at least one of the wound electrodes that is not sandwiched between layers of the other wound electrode has an average thickness that is no more than 80% the average thickness of the portion of said at least one wound electrode that is sandwiched between layers of the other wound electrode.

As used herein, an electrode strip shall mean an active electrode such as a solid anode or cathode of the cell or an electrochemically inactive strip such as an anode collector or a cathode collector employed along with an active liquid, solid or gas anode or cathode, respectively.

Preferably, the average thickness of the portion of the wound electrode that is not sandwiched between layers of the other wound electrode should be between about 20 and 80 percent, preferably between about 40 and 60 percent of the portion of said wound electrode that is sandwiched between layers of said other wound electrode.

The separator layer may be interposed between the electrode strips prior to helically winding the electrode assembly or at least one of the electrodes could be encased within a separator and then helically wound with the other electrode. The main requirement is that the average thickness of the portion of the wound electrode that is not opposed on both sides by the other electrode be less than the average thickness of the portion of the electrode that is opposed on both sides by the other electrode. This type of construction provides a means for increasing the ampere-hour output from a given cell volume (i.e., improving the volumetric efficiency of the cell) and improving the high-rate performance of the cell through decreased internal resistance resulting from the greater anode-to-cathode interface area obtained.

The coiled electrode assembly of this invention can be used in many different types of cell systems such as aqueous (i.e., alkaline) or nonaqueous cell systems employing solid or liquid cathodes. When the coiled electrode assembly is employed in lithium non-aqueous cells, it would be sometimes preferable to make the lithium the outer wound electrode. For example, the lithium electrode could comprise two lithium strips with one strip longitudinally offset a fixed distance corresponding to the outer circumference of the coiled electrode assembly. Thereafter the lithium electrode is superimposed on a cathode strip such as $MnO_2$, CuO, $CF_x$ or the like with a separator interposed between them, and then helically wound in a direction such that the single layer of lithium comprises the outer circumference of the coiled assembly. In this embodiment, the average thickness of the segment of the lithium electrode that is not sandwiched between layers of the coiled other electrode will be approximately 50% less than the thickness of the segment of the lithium electrode that is opposed on both sides by the other electrode. Although the coiled electrode assembly of this invention entails some sacrifice in active material input compared to standard molded or injected mix constructions, it does have the advantage over conventional coiled electrode assemblies in that compared to conventional coiled electrode assemblies, it can accommodate a better physical balance of the electrochemically utilizable active materials which will result in a greater output capacity for the cell. For example, in a lithium/organic electrolyte/CuO system enclosed in a container which is 1.65 inches in height by 0.550 inch diameter, the coiled electrode assembly of this invention has been calculated to have about a 30 percent increase in ampere-hour input compared to the use of a conventional type coiled electrode assembly.

The separator for use in this invention could be selected from a number of ionically permeable materials such as polypropylene, felted glass fibers and coated papers.

Cathode collectors or anode collectors suitable for use in this invention would be sintered nickel or carbonaceous materials such as Teflon-bonded carbon or the like.

The cylindrical can and cover for use in this invention can be stainless steel, nickel-plated steel or some other conductive material that will not corrode or otherwise deteriorate when in contact with the active cell components. Preferably for nonaqueous systems the can and cover could be made of 304L type stainless steel which has been heat treated to release the inherent stresses introduced during conventional drawing operations.

The insulating gasket member disposed between the cover and the can has to be stable in the presence of the active components and discharge products and can be selected from such materials as nylon, polypropylene, polyethylene, polytetrafluoroethylene, fluorinated ethylene-propylene polymer, ethylene copolymer with fluorinated ethylenepropylene, polychlorotrifluoroethylene, perfluoroalkoxy polymer and the like.

Anodes suitable for use in this invention could be lithium, calcium, magnesium, sodium and zinc. Cathodes suitable for use in this invention could be $MnO_2$, HgO, $Ag_2O$, CuO, $FeS_2$, $(CF_x)_n$ with x greater than 0 and less than 1.1, $SOCl_2$, $(C_2F)_n$, $SO_2Cl_2$ and $SO_2$. Some preferred cell systems for use in this invention would be as shown in the Table below.

TABLE

| Anode | Cathode | Electrolyte |
| --- | --- | --- |
| lithium | $MnO_2$ | organic |
| lithium | $SOCl_2$ | $LiAlCl_4$ in $SOCl_2$ |

TABLE-continued

| Anode | Cathode | Electrolyte |
| --- | --- | --- |
| lithium | $(CF_x)_n$ | organic |
| zinc | $MnO_2$ | aqueous alkaline |
| cadmium | nickel hydroxide | aqueous alkaline |
| lithium | $SO_2$ | organic |

When the anode for use in this invention is lithium, then a lithium foil could be secured onto a metallic conductive foil or carrier (anode collector) such as nickel.

A conductive tab such as nickel may be welded to one end of the anode sheet to be used as a tab for electrically connecting the anode to the cover or container of the cell. It is important that the metallic conductive support carriers for the anode be stable and uncorrodible in the presence of the electrochemical couple. In a like manner, a suitable cathode collector could be employed along with the active cathode material.

The foregoing and additional objects will become more fully apparent from the description hereinafter and the accompanying drawings.

BRIEF DESCRIPTION OF THE DRAWINGS

Referring in detail to FIG. 1, there is shown an uncoiled assembly 2 composed of a positive electrode strip 4 and collector 5 encased in a separator 6 positioned below a negative electrode composed of two anode strips 8-10 sandwiched about a perforated metal foil anode collector 12. The superimposed electrode strips 4 and 8-10 are then helically wound in the direction shown by the curved arrow to form a coiled electrode assembly in a conventional manner. In FIG. 3, a conventional coiled electrode assembly 14 of the type shown in FIG. 1 in the uncoiled form is shown with similar components identified with the same reference numbers. With the electrode strips helically wound, the electrode strip 8 is the outermost wound electrode and contacts the can 16 as shown in FIG. 3. Electrode 4 is the innermost wound electrode strip and it is substantially sandwiched between layers of the outermost wound electrode strips 8-10. In a like manner, although the outermost coiled electrode strips 8-10 are substantially sandwiched between layers of the innermost wound electrode 4, the outer portion 9 of strip 8 forming the circumference of the coiled electrode assembly 14 and the inner portion 11 of strip 10 are not opposed by a layer of the inner wound electrode 4. Consequently, since the thickness of the outer electrode is constant throughout its length, then the active material of electrode 8 forming the outer circumference portion 9 and electrode 10 forming the inner portion 11 of the coiled assembly 14 are not utilized during cell discharge. This results in substantial physical imbalance in the electrochemically utilizable active materials adjacent the circumference of the coiled assembly 14 and in the center of the coiled assembly 14 thereby wasting space that could be better utilized by redistribution of the active material which is then able to contribute to the useful output capacity of the cell. The center opening 7 can serve as a reservoir for the cell's electrolyte, which electrolyte is also absorbed in the separator.

FIG. 2 shows an uncoiled assembly of electrode strips using the novel construction of this invention. Specifically, cathodic electrode strip 20 incorporating collector 21 is shown encased in a separator 22. Positioned above electrode strip 20 is electrode strip assembly 24 composed of two anodic strips 26–28 sandwiched about a perforated metal foil anode collector 30. The lower disposed anodic strip 28 extends (3) beyond the upper disposed anodic strip 26 at one end of the assembly 24, and the upper disposed anodic strip 26 extends 15 beyond the lower disposed anodic strip at the other end of the assembly 24. Thus each end portion 3 and 15 of the strip assembly 24 is composed of a single layer of the anodic material so that when the entire assembly is helically wound in the direction indicated by the curved arrow, the outer circumference will be composed of only one layer of the anodic material and the inner segment of the coiled assembly will also be composed of one layer.

FIG. 4 shows the electrode strip assembly of FIG. 2 after it has been helically wound in a conventional manner and positioned in a container 32. The component parts of the electrode strip assembly are identical to the ones shown in FIG. 2 and, therefore, have been given the same reference numbers in FIG. 4. As evident from FIG. 4, the outer circumferential portion 3 and the inner portion 15 of the coiled electrode assembly 24 consist only of one layer of the anodic material 28 and 26, respectively. Thus these portions of electrode strip assembly 24 that are not opposed on both sides by a layer of the cathodic electrode strip 20 are approximately 50% thinner in thickness than the thickness of the remaining portion of electrode strip assembly 24 that is opposed on both sides by a layer of the cathodic electrode strip 20. The space saved by the use of a thinner segment of the outer wound electrode strip can be used for redistribution of the active materials which can contribute to the useful output capacity of the cell.

Figure 1:
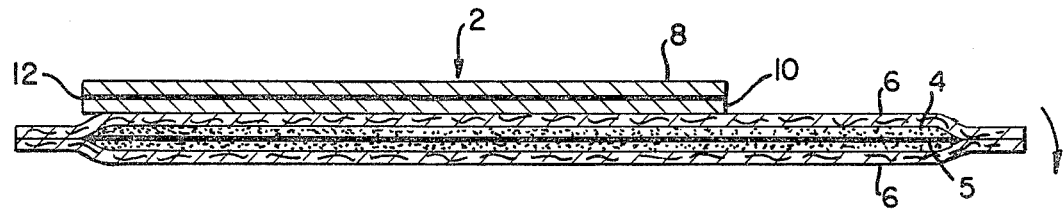
FIG. 1 is an elevational view taken through a conventional electrode strip assembly prior to being helically wound into a coiled electrode assembly.
Figure 2:
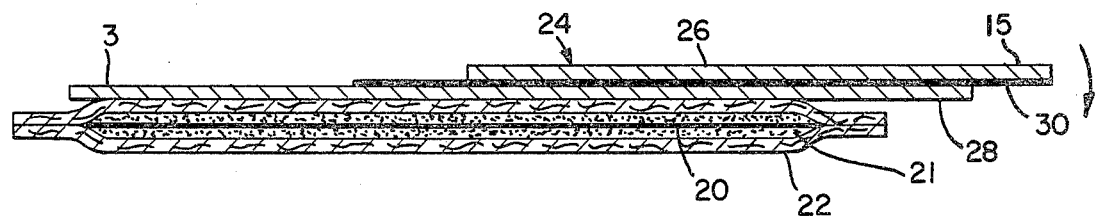
FIG. 2 is an elevational view taken through an electrode strip assembly of this invention prior to being helically wound into a coiled electrode assembly.
Figure 3:
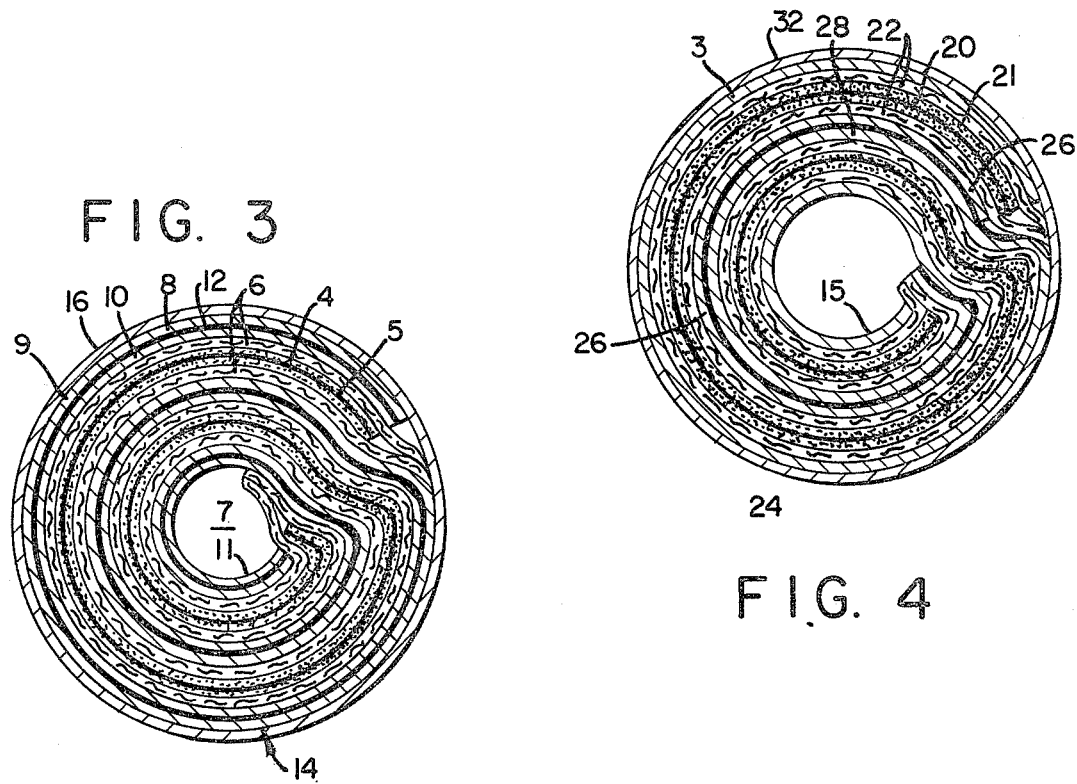
FIG. 3 is a cross-sectional view of the electrode strip assembly of FIG. 1 shown coiled and disposed in a cylindrical container.
Figure 4:
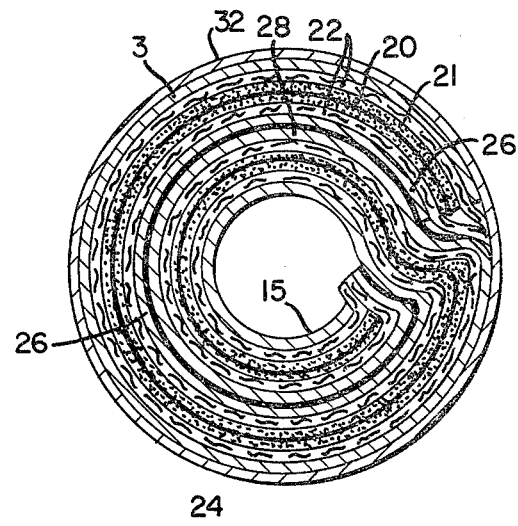
FIG. 4 is a cross-sectional view of the electrode strip assembly of FIG. 2 shown coiled and disposed in a cylindrical container.

It is to be understood that the inner portion of the electrode strip that is not opposed on both sides by the other electrode strip could be the inner wound electrode strip. Thus the outer wound electrode strip would have one end thinner than its remaining portion and the inner wound electrode strip would also have one end thinner than its remaining portion.

The subject invention is especially well suited for small cylindrical cells because the proportion of the segment of the electrode that is not opposed on both sides by the other electrode to the segment that is opposed on both sides by the other electrode is greater than that in larger size cylindrical cells due to the limitation in the number of windings permissible in such small cells.

Modifications may be made in the construction details and in the arrangements of the related components without departing from the spirit of the invention as set forth in the appended claims.

What is claimed is:

1. An electrochemical cell comprising a coiled electrode assembly disposed within a container closed by a cover, said coiled electrode assembly comprising an elongated first electrode strip, an elongated second electrode strip and a separator, all of which are helically wound about each other so that the separator is interposed between said first electrode strip and said second electrode strip, the improvement wherein the portion of at least one of the wound electrodes that is not sandwiched between layers of the other wound electrode has an average thickness that is no greater than 80% of the average thickness of the portion of said at least one wound electrode that is sandwiched between layers of the other wound electrode.

2. The electrochemical cell of claim 1 wherein the average thickness of the portion of said at least one electrode that is not sandwiched between layers of the other wound electrode is between about 20% and about 80% of the average thickness of the portion of said at least one wound electrode that is sandwiched between layers of the other wound electrode.

3. The electrochemical cell of claim 2 wherein the average thickness of the portion of said at least one electrode that is not sandwiched between layers of the other wound electrode is between about 40% and about 60% of the average thickness of the portion of said at least one wound electrode that is sandwiched between layers of the other wound electrode.

4. The electrochemical cell of claim 1 wherein one of said first and second electrodes comprises an anode collector along with an active anode.

5. The electrochemical cell of claim 1 wherein one of said first and second electrodes comprises a cathode collector along with an active cathode.

6. The electrochemical cell of claim 1 employing an anode is selected from the group consisting of lithium, sodium, calcium, magnesium and zinc.

7. The electrochemical cell of claim 5 wherein the cathode is selected from the group consisting of $MnO_2$, $CuO$, $HgO$, $Ag_2O$, $FeS_2$, $(CF_x)_n$ where x is larger than 0 and less than 1 and $(C_2F)_n$.

8. The electrochemical cell of claim 1 employing an active cathode selected from the group consisting of $SOCl_2$, $SO_2Cl_2$ and $SO_2$.

9. The electrochemical cell of claim 1 employing an organic electrolyte and wherein the first electrode is lithium and the second electrode is $MnO_2$.

10. The electrochemical cell of claim 1 employing an organic electrolyte and wherein the first electrode is lithium and the second electrode is $CuO$.

11. The electrochemical cell of claim 1 employing an organic electrolyte and wherein the first electrode is lithium and the second electrode is $CF_x$ wherein x is greater than 0 and less than 1.1.

12. The electrochemical cell of claim 1 employing an organic electrolyte and wherein the first electrode is lithium and the second electrode is $C_2F$.

13. The electrochemical cell of claim 1 wherein the first electrode is a carbonaceous material and wherein a cathode is employed which is selected from the group consisting of $SOCl_2$, $SO_2Cl_2$ and $SO_2$.

* * * * *